Figure 1:
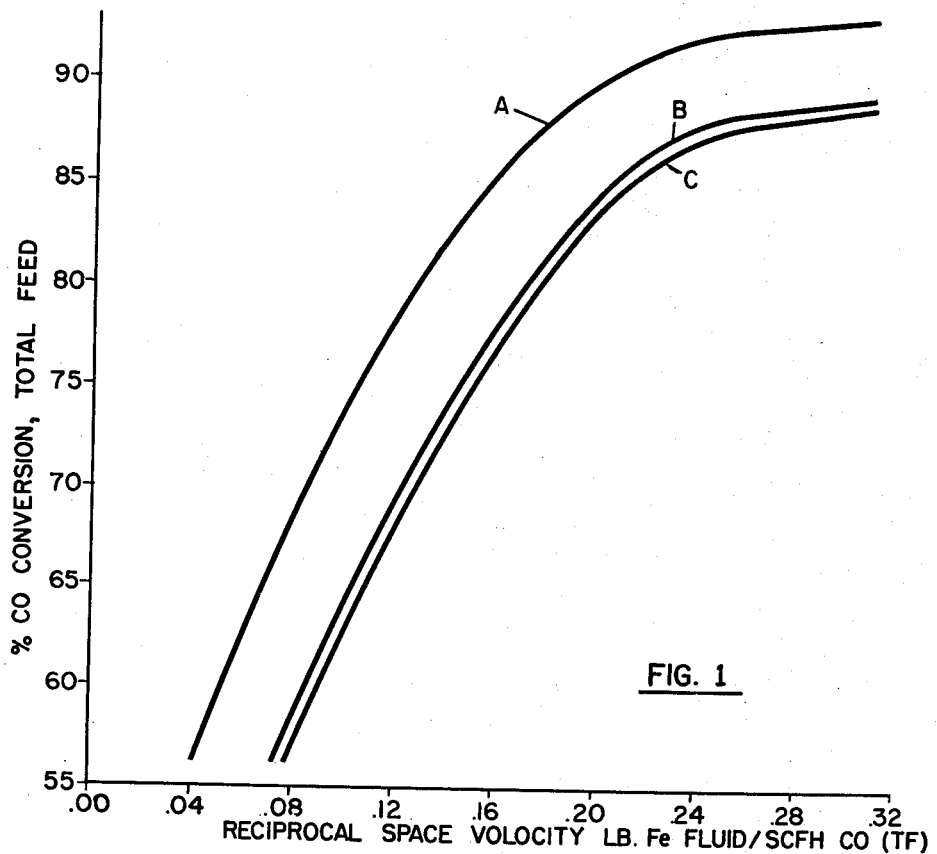

July 27, 1954

C. G. FRYE 2,684,975

USE OF CARBON DIOXIDE IN HYDROCARBON SYNTHESIS

Filed Dec. 30, 1950

INVENTOR.
CLIFTON G. FRYE
BY
ATTORNEY

Patented July 27, 1954

2,684,975

UNITED STATES PATENT OFFICE 2,684,975

USE OF CARBON DIOXIDE IN HYDROCARBON SYNTHESIS

Clifton G. Frye, Tulsa, Okla., assignor to Stanolind Oil and Gas Company, Tulsa, Okla., a corporation of Delaware Application December 30, 1950, Serial No. 203,720

10 Claims. (Cl. 260—449.6)

The present invention relates to the field of hydrocarbon synthesis. More particularly, it is concerned with a novel method for increasing the total quantity of acids produced during synthesis while maintaining the total feed CO conversion at normal levels.

In the past, the value of the addition of varying amounts of $CO_2$ to the feed employed in hydrocarbon synthesis has been recognized, principally for the purpose of reducing the net production of $CO_2$ and methane, as taught by Eastman U. S. 2,436,957 and Watson U. S. 2,486,894. More recently, Worsham et al. U. S. 2,521,436 observed that increased yields of acids can be obtained by increasing the $CO_2$ content of the total feed up to about 56 per cent.

While I have found that the presence of additional quantities of $CO_2$ in the feed stream do function to bring about the above-mentioned results, it has been my further observation that the per cent of CO converted in the total feed decreases with increasing concentrations of $CO_2$ present therein. The decrease in total feed CO conversion, when employing relatively high percentages of $CO_2$, may be due to a number of factors. However, on the basis of experimental evidence, it is my conclusion that the principal reason for the decrease in CO conversion, when the feed is enriched with $CO_2$, resides in the fact that in the vicinity of the zone in which the feed is introduced the prevailing conditions are reducing in nature. Thus, with a reactor employing a fluidized catalyst, the major portion of hydrocarbon synthesis, i. e., 80 to 85 per cent, occurs in the lower half of the reactor, the principal conversion taking place in the lower one-third of the catalyst bed. The introduction of an oxidizing gas, such as $CO_2$, into the synthesis reactor along with the regular feed stream obviously disturbs and, to some extent, prevents the interaction of the catalyst and the synthesis gas, which in turn reduces the efficiency of the process by diminishing the quantity of CO converted to useful products.

Accordingly, it is an object of my invention to provide a method for synthesizing hydrocarbons whereby $CO_2$ injection may still be employed with its attendant advantages while at the same time overcoming the disadvantages of low total feed CO conversion which is so characteristic of prior procedures. It is a further object of my invention to provide a process capable of materially increasing the total quantity of acids produced during hydrocarbon synthesis without unfavorably effecting the conversion of CO to desirable hydrocarbons and other useful products.

It is a still further object of my invention to effect maximum production of both useful hydrocarbons and acids produced during hydrocarbon synthesis by injecting $CO_2$ into the reactor as a side stream above the zone of principal hydrocarbon synthesis.

In carrying out the process of my invention, I may employ reaction conditions previously considered suitable such as, for example, synthesis gas consisting of 95 to 98 per cent CO and $H_2$ in a $H_2$:CO ratio of from 1.5:1 to 2.0:1, temperatures of between 600 to 670° F., pressures of 325 to 425 p. s. i. g. and recycle ratios of from about 1.2 to about 1.7 volumes of recycle gas per volume of fresh feed. While the operating conditions set forth above are those which I consider preferable, it is to be strictly understood that the process of my invention is capable of producing advantageous results when employing any of a number of known synthesis conditions or various combinations thereof.

Synthesis gas is introduced into the reactor in the normal fashion where it contacts a fluid bed of hydrocarbon synthesis catalyst and synthesis of hydrocarbons, both liquid and gaseous, effected. $CO_2$ may be advantageously injected into the reactor during synthesis at substantially any point thereof above the lower or first one-third of the reactor, i. e., above the zone in which the principal conversion of CO to hydrocarbons occurs. For most operations, I have found that in the majority of instances favorable results can be secured by introducing the $CO_2$ into the reactor at a level which represents from about two-fifths to about three-fifths of the distance from the top of the catalyst bed and preferably at a point corresponding to approximately one-half of the distance from the top of the bed.

While the process of my invention is applicable to hydrocarbon synthesis procedures employing any of the several types of known catalysts, I prefer to use a catalyst commonly designated as mill scale, which is described and claimed in U. S. Patent No. 2,485,945 to S. W. Walker. This catalyst is prepared from the oxide scale or layer obtained by rolling iron or various alloys thereof at elevated temperatures, for example, in the range of 1000 to 1300° C. Microscopic examination of the scale or oxide layer thus obtained when ground to a fineness of 325 mesh indicates that it still retains its characteristic plate-like structure.

Concentration of $CO_2$ introduced into the zone above that portion of the catalyst bed in which principal synthesis of hydrocarbons is effected may vary rather widely. However, if added in quantities in excess of about 75 mol per cent (total feed basis), the linear velocity differences between the upper and lower sections of the bed generally become too great for the maintenance of good fluidization in both sections. Accordingly, for the majority of instances, I generally prefer to employ $CO_2$ concentrations from about 10 to about 40 mol per cent (total feed basis). Utilization of $CO_2$ in the aforesaid quantities in accordance with my invention gives highly advantageous results without interfering in any respect with catalyst performance or CO conversion.

To further illustrate the harmful effect of $CO_2$ on total feed CO conversion when the former is introduced along with synthesis gas, there is presented in Fig. 1 a series of curves based on actual synthesis runs in which varying amounts of $CO_2$ were mixed with the synthesis gas. In Fig. 1, the total feed CO conversion is plotted against reciprocal space velocity. Curve A represents CO conversion obtained under conditions similar to those outlined in the example below with the exception that the $CO_2$ concentration in the fresh feed was 1.8 mol per cent in the case of the run forming the basis of curve A. Curve B is based on the results secured when the $CO_2$ content of the fresh feed was increased to 6.0 mol per cent, while curve C shows what happens to total feed CO conversion when the $CO_2$ in the fresh feed is increased to 10 mol per cent. In both instances (curves B and C), lower conversions resulted at the same space velocity than are obtainable under the same conditions with normal $CO_2$ concentrations (0.5 to about 1.5 mol per cent) in the fresh feed. During these runs, it was likewise observed that for a given $CO_2$ content an increase in recycle ratio at constant space velocity also resulted in a decrease in conversion below the value observed at a 1.0 recycle ratio. The recycle ratio used in obtaining the data shown in Fig. 1 was 1.5. The effect of increasing the $CO_2$ content of the fresh feed and of increasing recycle ratio on total feed conversion appears similar. However, it is to be noted that an increase in recycle ratio is accompanied by an increase in fresh feed conversion while an increase in fresh feed $CO_2$ content decreases both the fresh feed and total feed conversions.

Figure 2:
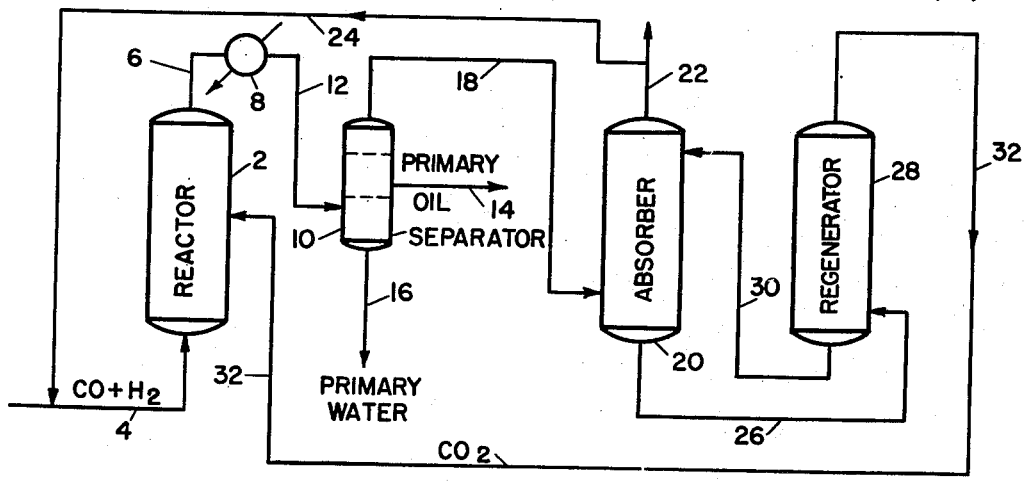

Fig. 2 represents a flow diagram employing an embodiment of the present invention in which synthesis gas is fed into reactor 2 through line 4. Within the reactor, synthesis gas on contact with fluidized, alkali-promoted iron catalyst is converted into hydrocarbon products comprising both liquid and gaseous paraffinic and olefinic hydrocarbons. The conditions for carrying out operations of this type are now generally known. Reaction products together with unreacted CO and $H_2$ and any diluent, such as nitrogen, which may be present, leave reactor 2 through line 6 where they are cooled and condensed in cooler 8. The resulting cooled stream is then introduced into separator 10 through line 12. Primary oil and primary water are continuously withdrawn from separator 10 through lines 14 and 16 respectively and separately processed in accordance with procedures outside the scope of this invention. The gaseous components introduced into separator 10 consist chiefly of $CO_2$, CO, $H_2$ and $C_1$ and $C_2$ hydrocarbons. This gaseous mixture is withdrawn from separator 10 through line 18 which carries it to absorber 20 equipped to separate $CO_2$ from the remaining gaseous effluent issuing from separator 10. The system employed for accomplishing this object may embody any of a number of well established procedures. In general, I have found that a $CO_2$ separation system involving absorption of the $CO_2$ from said gaseous mixtures by the use of a 15 to 25 weight per cent aqueous monoethanolamine solution followed by liberation of $CO_2$ from the resulting monoethanolamine salt constitutes a very adequate $CO_2$ separation method for the purposes of the present invention. Within absorber 20, $CO_2$, present in the gaseous mixture fed into the absorber through line 18, combines with monoethanolamine. The gas from which the $CO_2$ has been stripped by the action of monoethanolamine thereon leaves absorber 20 through line 22 and a portion thereof recycled through line 24 to line 4 where it is mixed with fresh synthesis gas in line 4 prior to introduction into reactor 2. The remainder of this gas may be vented to the atmosphere through line 22 or processed in accordance with other procedures outside the scope of my invention. The solution of monoethanolamine which is saturated with $CO_2$ leaves absorber 20 through line 26 and is introduced into regenerator 28 in which $CO_2$ is liberated. The lean monoethanolamine solution is withdrawn from regenerator 28 through line 30 and returned to absorber 20 where it may again be used to separate $CO_2$ contained in the gases supplied by line 18. The stream consisting essentially of $CO_2$ liberated in regenerator 28 is withdrawn through line 32 and returned to the reaction zone at a point approximately half-way up from the bottom of the fluidized catalyst bed in reactor 2. The recycling of $CO_2$ in this manner renders possible increased acid production while at the same time maintaining a high level (90 to 92 per cent) total feed CO conversion. It will, of course, be appreciated that the absorber may be operated in a manner such that some of the $CO_2$ remains in the exit gas coming from the absorber. This gas when recycled should not contain $CO_2$ in concentrations in excess of those required to yield a total feed containing not more than about 15 mol per cent $CO_2$.

The process of my invention is further illustrated by the specific example which follows:

EXAMPLE

A hydrocarbon synthesis gas mixture containing 95 mol per cent $H_2$ and CO in a $H_2$ : CO ratio of 1.85 and about 5 mol per cent inerts, including about 1.5 mol per cent $CO_2$, is reacted at a temperature of about 650° F. and a pressure of 400 p. s. i. g. in a reactor 20 feet long and 8 inches I. D. containing a fluidized bed approximately 10 feet in height and consisting essentially of reduced, finely divided iron mill scale catalyst which contains from about 0.5 to 0.7 weight per cent $K_2O$ as promoter. Recycle ratios of 1.0 to 2.0 and space velocities of from about 4.5 to about 5.5 S. C. F. H. (CO)/lb. iron are employed. During the first 800 hours of the run, the above conditions are maintained. For approximately 100 hours thereafter, $CO_2$ is added to the fresh feed in concentrations of about 10 mol per cent. Following operation under the latter conditions, a stream consisting essentially of $CO_2$ is introduced at various levels in the catalyst bed in a concentration of about 10 mol per cent $CO_2$, based on fresh feed, for a period covering a total of approximately 100 hours. During the latter set of conditions, the $CO_2$ concentration in the total feed is held at the same level as that employed for the first 800 hours. The results obtained by operating under the three above-mentioned sets of conditions are given in the table below and are identified as stages A, B and C, respectively. The recycle ratio employed in stage A was 1.0 while the ratio utilized in stages B and C was 1.5.

*Table I*

|  | Stage A | Stage B | Stage C |
|---|---|---|---|
| Catalyst Age, Hours | 122-800 | 800-898 | 898-993 |
| Percent CO Conversion, Total Feed | 92-92.5 | 85 | 91-92 |
| Mol Percent $CO_2$ Added (Fresh Feed Basis) | 1.5 | 10 | [1] 10 |
| Percent CO Converted to $C_3$ and higher Hydrocarbons | 62 | 66 | 62-64 |
| Percent Yield of Acids (Based on Total Weight of Hydrocarbons Produced) | 3.1 | 7.5 | [2] 1.5 |
| Recycle Ratio | 1.0 | 1.5 |  |

[1] Total feed.
[2] The effect of injecting $CO_2$ into the fluid catalyst bed at various levels on acid yield and on CO conversion is shown by the data appearing in the table below.

*Table II*

| $CO_2$ Injection, Distance (Feet) from Top of Catalyst Bed | 4 | 3.5 | 1.5 | 0 | 10 |
|---|---|---|---|---|---|
| Percent Total Feed CO Conversion | 90.9 | 91.5 | 91.8 | 92.0 | 85 |
| Percent Yield of Oil-Soluble Acids [1] | 6.0 | 5.1 | 4.4 | 3.9 | 7.5 |

[1] The yield of water-soluble acids also increases with spaced injection of $CO_2$ in accordance with the present invention but only to the extent of 80-85 percent of that realized in the case of the oil-soluble acids.

From the foregoing, it is evident that the combination of $CO_2$ with synthesis gas definitely tends to lower the total feed CO conversion. Also, it will be apparent that by injecting $CO_2$ into the catalyst bed at a point above the zone in which principal conversion to hydrocarbons occurs as contemplated by my invention, yields of acids substantially in excess of those produced under normal synthesis conditions can be secured while at the same time maintaining a high total feed CO conversion.

It is to be strictly understood that the foregoing example, flow diagram and other specific illustrative material contained herein are not in any way to be regarded as limiting the scope of my invention. On the contrary, the process of the present invention is intended to cover the broad idea of introducing $CO_2$ at a point located in the upper two-thirds of a hydrocarbon synthesis zone during synthesis to obtain acids in yields greater than those normally achieved while at the same time maintaining the production of hydrocarbons and other valuable products at normal CO conversion levels. Thus, although the process of my invention has been described with particular emphasis on the application thereof to fluid bed operation, the principles taught herein are equally applicable to fixed bed procedures. The various concentrations of $CO_2$ appearing in certain of the claims are expressed on a total feed basis.

What I claim is:

1. In a process for the synthesis of liquid hydrocarbons wherein a feed gas consisting chiefly of carbon monoxide and hydrogen is introduced into a generally vertically positioned reaction zone having a hydrocarbon synthesis catalyst bed therein and under known conditions of hydrocarbon synthesis, the step which comprises injecting a gaseous stream consisting essentially of carbon dioxide not in excess of about 75 mol per cent (total feed basis) into said reaction zone at a point in said zone which is beyond the gas inlet side of said bed at least a distance corresponding to about one third of the length of said bed.

2. The process of Claim 1 in which ground and reduced iron mill scale is employed as the catalyst.

3. In a process for the synthesis of liquid hydrocarbons wherein a feed gas consisting chiefly of carbon monoxide and hydrogen is introduced into a generally vertically positioned reaction zone having a hydrocarbon synthesis catalyst bed therein and under known conditions of hydrocarbon synthesis, the step which comprises injecting a gaseous stream consisting essentially of carbon dioxide not in excess of from about 10 to about 40 mol per cent (total feed basis) into said reaction zone at a point in said zone which is above the lower one third of said bed.

4. In a process for the synthesis of liquid hydrocarbons wherein a feed gas consisting chiefly of carbon monoxide and hydrogen is introduced into a generally vertically positioned reaction zone having a bed of iron hydrocarbon synthesis catalyst therein and under known conditions of hydrocarbon synthesis, the step which comprises injecting a gaseous stream consisting essentially of carbon dioxide not in excess of from about 10 to about 40 mol per cent (total feed basis) into said reaction zone only at a point in said zone which is above the lower one third of said bed.

5. In a process for the synthesis of liquid hydrocarbons wherein a feed gas consisting chiefly of carbon monoxide and hydrogen is introduced into a generally vertically positioned reaction zone having a fluidized bed of iron hydrocarbon synthesis catalyst and under known conditions of hydrocarbon synthesis, the step which comprises injecting a gaseous stream consisting essentially of carbon dioxide into said reaction zone in a concentration up to about 75 mol per cent (total feed basis) and only at a point in said zone which is above the lower one third of said bed.

6. In a process for the synthesis of liquid hydrocarbons wherein a feed gas consisting chiefly of carbon monoxide and hydrogen is introduced into a generally vertically positioned reaction zone having a fluidized bed of iron hydrocarbon synthesis catalyst and under known conditions of hydrocarbon synthesis, the step which comprises injecting a gaseous stream consisting essentially of carbon dioxide into said reaction zone in a concentration up to about 75 mol per cent (total feed basis) and only at a point in said zone which is located between about the upper two fifths and about the upper three fifths of said catalyst bed.

7. In a process for the synthesis of liquid hydrocarbons wherein a feed consisting chiefly of carbon monoxide and hydrogen is introduced into a generally vertically positioned reaction zone having a fluidized bed of iron hydrocarbon synthesis catalyst and under known conditions of hydrocarbon synthesis, the step which comprises injecting a gaseous stream consisting essentially of carbon dioxide into said recation zone in a concentration of from about 10 to about 40 mol per cent (total feed basis) and only at a point in said zone which is above the lower one third of said bed.

8. In a process for increasing the production of valuable fatty acids formed simultaneously with liquid hydrocarbons by introducing a feed gas consisting chiefly of carbon monoxide and hydrogen into a generally vertically positioned reaction zone having a fluidized bed of hydrocarbon synthesis catalyst under known synthesis conditions, and wherein said increase in fatty acid products is effected while maintaining total feed carbon monoxide conversions at a level of at least 89 to 91 per cent, the step which comprises injecting a gaseous stream consisting essentially of carbon dioxide into said reaction zone in a concentration up to about 75 mol per cent (total feed basis) and only at a point in said zone which is above the lower one third of said bed.

9. The process of Claim 8 in which ground and reduced iron mill scale is employed as the catalyst.

10. In a process for the synthesis of liquid hydrocarbons wherein a feed gas consisting chiefly of carbon monoxide and hydrogen is introduced into a reaction zone having a fixed bed of hydrocarbon synthesis catalyst therein and under known conditions of hydrocarbon synthesis, the step which comprises injecting a gaseous stream consisting essentially of carbon dioxide into said reaction zone at a point in said zone which is beyond the gas inlet side of said bed at least a distance corresponding to about one-third of the length of said bed.

References Cited in the file of this patent

UNITED STATES PATENTS

| Number | Name | Date |
|---|---|---|
| 2,414,276 | Sensel et al. | Jan. 14, 1947 |
| 2,436,957 | Eastman | Mar. 2, 1948 |
| 2,436,962 | Gaucher | Mar. 2, 1948 |
| 2,464,505 | Hemminger | Mar. 15, 1949 |
| 2,485,945 | Walker | Oct. 25, 1949 |
| 2,521,436 | Worsham et al. | Sept. 5, 1950 |
| 2,527,846 | Phinney et al. | Oct. 31, 1950 |
| 2,533,666 | Gunness | Dec. 12, 1950 |
| 2,573,795 | Lanning | Nov. 6, 1951 |